United States Patent [19]
Eguchi et al.

[11] Patent Number: 4,617,787
[45] Date of Patent: Oct. 21, 1986

[54] COMBINE HARVESTER MACHINE

[75] Inventors: Jutaro Eguchi; Tetsuichi Odahara; Junzo Sukenari, all of Sakai, Japan

[73] Assignee: Kubota, Ltd., Osaka, Japan

[21] Appl. No.: 785,022

[22] Filed: Oct. 4, 1985

Related U.S. Application Data

[63] Continuation of Ser. No. 547,823, Nov. 2, 1983, abandoned.

[30] Foreign Application Priority Data

Sep. 9, 1983 [JP] Japan ................................ 58-167240

[51] Int. Cl.⁴ ............................................ A01D 41/12
[52] U.S. Cl. ........................................ 56/14.6; 56/124
[58] Field of Search ............. 56/14.6, 124, 341, 327 R

[56] References Cited

U.S. PATENT DOCUMENTS

| 1,301,844 | 1/1919 | Jarvis | 56/14.6 |
| 1,642,287 | 9/1927 | Zuckerman | 56/327 R |
| 2,470,704 | 5/1949 | Korsmo et al. | 56/124 |
| 4,038,809 | 8/1977 | Arnould et al. | 56/14.6 |
| 4,225,036 | 9/1980 | Michael | 56/341 |

Primary Examiner—Gene Mancene
Assistant Examiner—David I. Tarnoff
Attorney, Agent, or Firm—Jordan and Hamburg

[57] ABSTRACT

In a combine harvester machine, the front conveyor is disposed such that the imaginary extending surface of its placing and conveying surface passes through or adjacent to the peripheral lower end of an auger equipped drum located backward of the conveyor.

3 Claims, 5 Drawing Figures

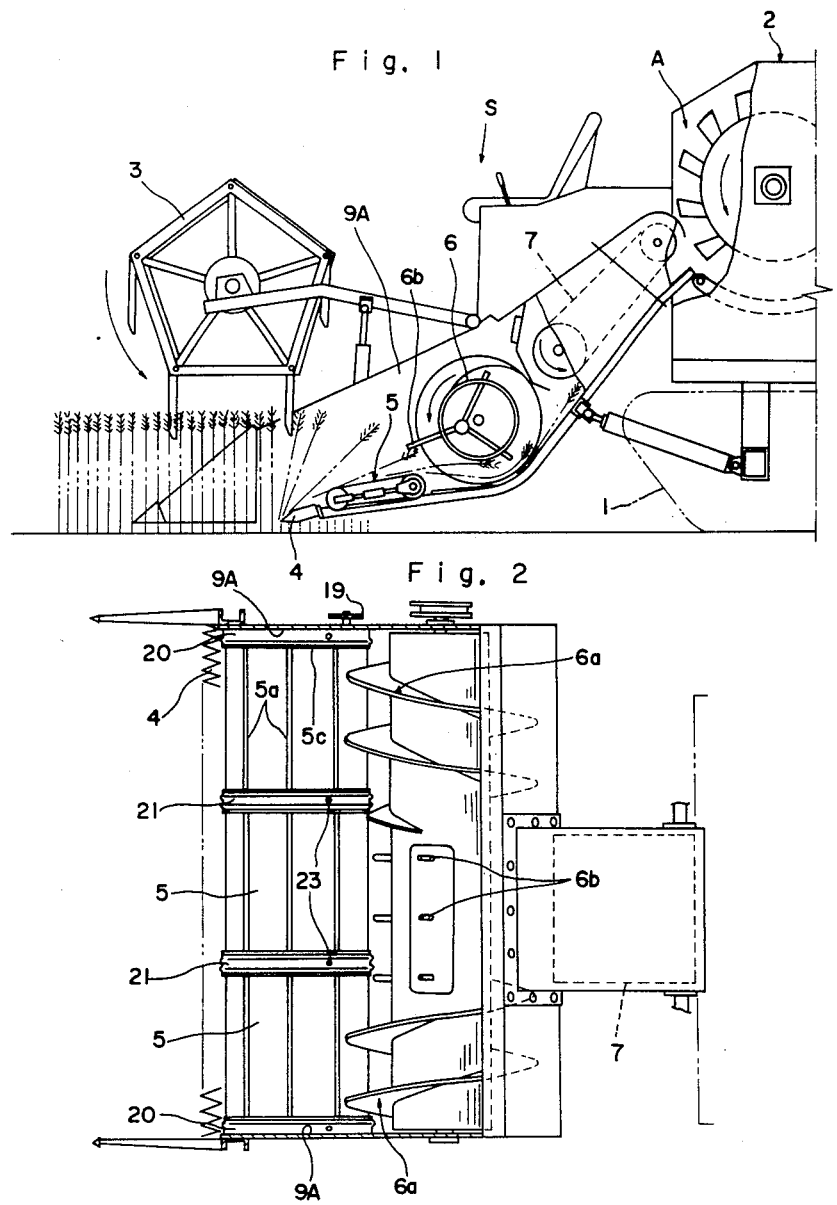

COMBINE HARVESTER MACHINE

This application is a continuation of application Ser. No. 547,823 filed Nov. 2, 1983, now abandoned.

BACKGROUND OF THE INVENTION

The present invention relates to a combine harvester machine having a reel for raking grown grain stalks backward with respect to the machine body, a blade under the reel for cutting stalks at their base portions, a front conveyor means for placing and conveying, backward of the machine body, harvested stalks as thrown with their tips moved ahead, an auger equipped drum rotatable around its transverse axis with the lower end thereof moved backward of the machine body, so as to transfer the stalks backward of the machine body while gathering the same toward the inner side of the machine body, and a conveyor for further conveying the stalks to a threshing chamber.

In such combine harvester machine, the front conveyor means is conventionally disposed such that the immaginary extending surface of its conveying surface passes through or adjacent to the rotation axis of the auger equipped drum. Such arrangement causes the tips of stalks conveyed by the front conveyor mean to be strongly pressed to the frontside peripheral surface of the auger equipped drum. This results in not only undesired removal of stalk grains, but also disturbance of a smooth movement of stalk tips toward the lower end of the auger equipped drum. This may disadvantageously make trouble in stalk conveyance; for example, the conveying path may be blocked.

It is to be noted that harvested stalks are pushed toward the auger equipped drum not only by a conveying force of the front conveyor means, but also by a pressure of the subsequently conveyed stalks. This fact greatly increases a contact pressure of stalk tips to the auger equipped drum.

According to such conventional structure, the rear end of the front conveyor means is separated from the front end of the auger equipped drum with a large distance which is required to form a stalk moving passage. Such arrangement disadvantageously necessitates a long front-back length in the combine harvester machine.

SUMMARY OF THE INVENTION

In view of the foregoing, it is an object of the present invention to provide a combine harvester machine having a shorter longitudinal length with simple modification permitting restraint of grain removal, as well as a smooth stalk conveyance.

A combine harvester machine in accordance with the present invention is characterized in that the front conveyor means is disposed such that the immaginary extending surface of its stalk placing and conveying surface passes through or adjacent to the peripheral lower end of the auger equipped drum.

Such arrangement permits stalk tips to be moved directly to the lower end of the auger equipped drum, with conveyance of stalks by the front conveyor means. This eliminates pressing contact of stalk tips to the frontside peripheral surface of the auger equipped drum, thus permitting restraint of grain removal and a secure conveyance of stalk tips to the auger equipped drum. A smooth conveyance is thus assured without any trouble such as blockage of the stalk conveying path.

Moreover, even if the rear end of the front conveyor means is located adjacent to the auger equipped drum, a predetermined stalk conveyance may be assured. Thus, a longitudinal length of the machine body may be shortened as compared with a conventional combine harvester machine mentioned earlier in which a stalk conveying path is formed between the front conveyor means rear end and the auger equipped drum front end. A readily applicable combine harvester machine is thus provided.

Other advantages and characteristics of the present invention will be apparent from the following description.

BRIEF DESCRIPTION OF THE DRAWINGS

FIG. 1 is a side view, with portions broken away, of the front portions of a combine harvester machine in accordance with the present invention;

FIG. 2 is a schematic plan view of a harvester device in FIG. 1;

DESCRIPTION OF THE PREFERRED EMBODIMENT

Figure 3:
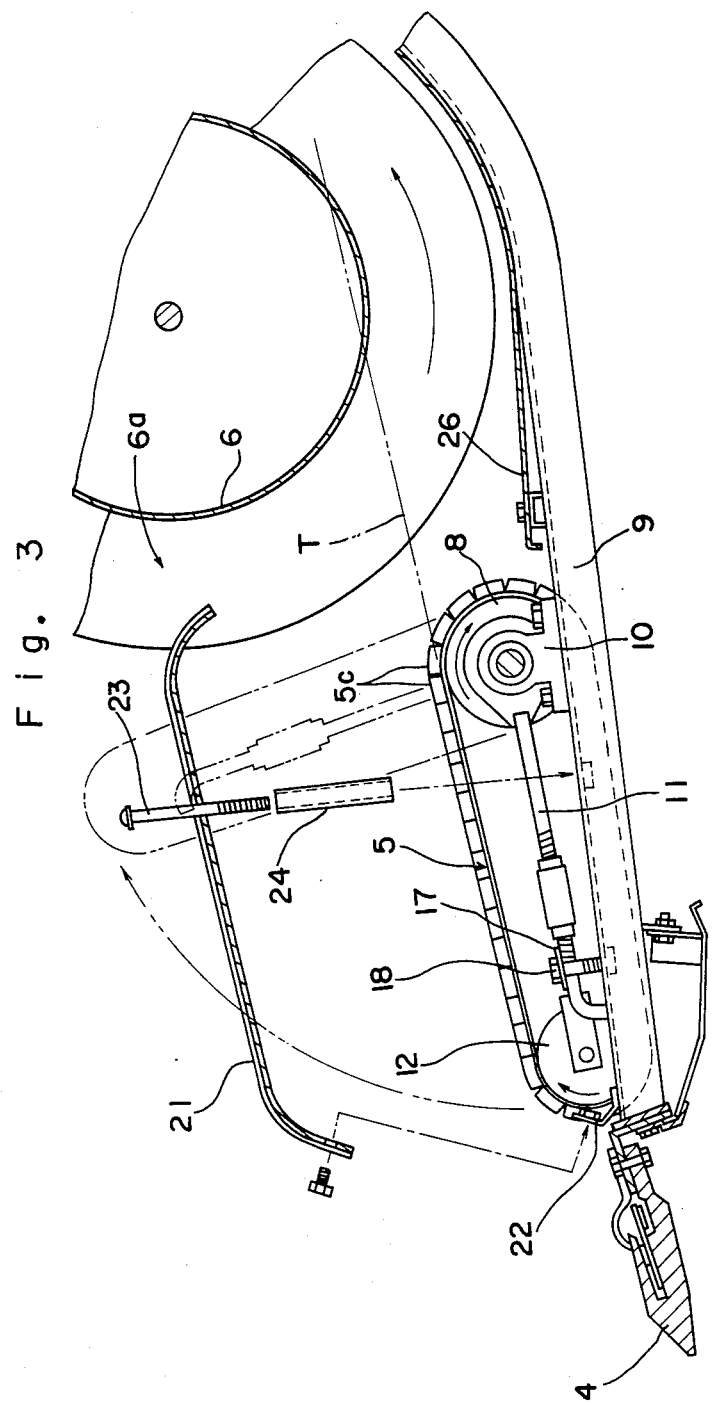
FIG. 3 is a side view, with portions exploded, illustrating how to mount the front conveyor means.

As shown in FIGS. 1-3, a combine includes a vehicle body having a pair of travelling crawlers 1, a thresher 2 and an operator seat S disposed on the vehicle body, and a vertically movable harvester connected to the front of the vehicle body, the harvester having a reel 3 for raking grown stalks backward of the machine body, a blade 4 under the reel 3 for cutting stalks at their base portions, a front conveyor means 5 for placing and conveying, backward of the machine body, harvested stalks as thrown with their tips moved ahead, an auger equipped drum 6 rotatable around its transverse axis with its lower end moved backward of the machine body, so as to transferring conveyed stalks backward of the machine body while gathering the same toward the inner side of the machine body, and a conveyor 7 for further conveying stalks from the drum 6 to a thresher chamber A.

The front conveyor means 5 has a plurality of conveyors arranged side by side in the transverse direction of the machine body such that the general immaginary extending surface T of the placing and conveying surface of the conveyor means 5 passes through or adjacent to the peripheral lower end of the auger equipped drum 6. Such arrangement permits the tips of stalks to be moved directly to the lower end of the auger equipped drum 6.

Figure 4:
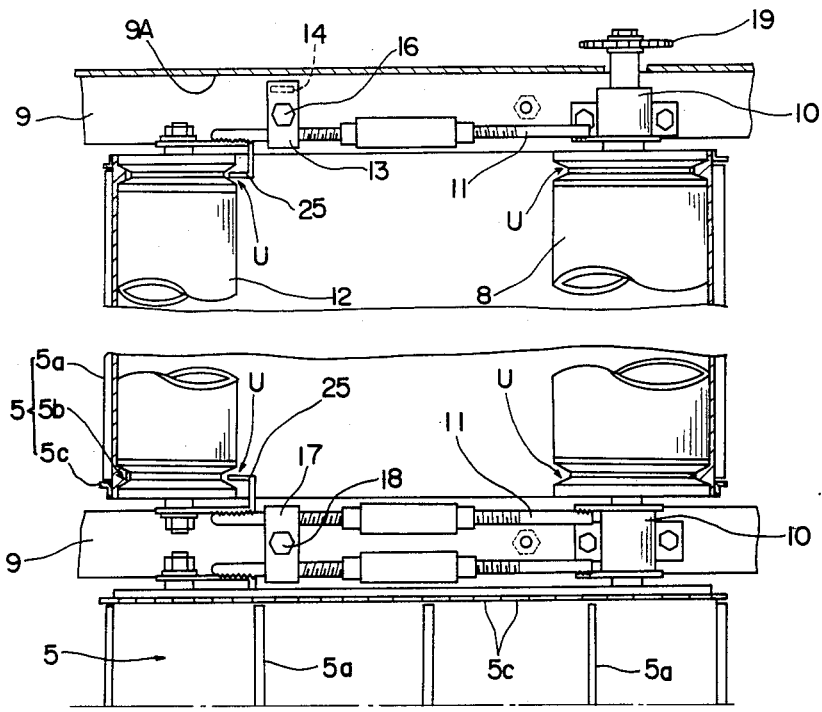
FIG. 4 is a plan view of main portions in FIG. 3.
Figure 5:
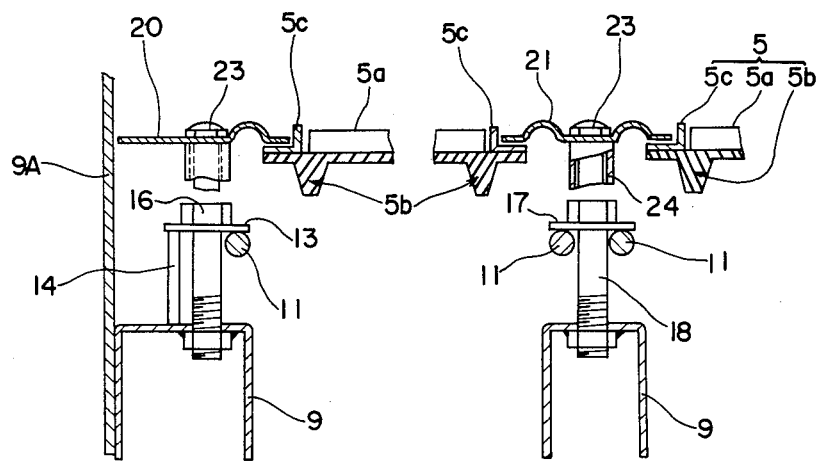
FIG. 5 is a front view, with portions broken away, of main portions in FIG. 3.

The description hereinafter will discuss the support structure of the front conveyor means 5 with reference to FIGS. 3 to 5.

Rear-side rotary members 8 for winding the conveyor rear ends are rotatably supported by brackets 10 attached to harvester frames 9 which are arranged side by side with suitable intervals in the transverse direction of the machine body. Rod-shape members 11 having turnbuckles are put, at the rear ends thereof, on the brackets 10 in a vertically swinging manner. Front-side rotary members 12 for winding the conveyor front ends are rotatably supported at the front ends of the rod-shape members 11. The front ends of the rod-shape members 11 are downwardly turned, so as to come in contact with the top surfaces of the frames 9.

Side plates 9A are located at the both transverse sides of the harvester. In order to prevent coming-up of the rod-shape members 11 located between these side plates 9A and their adjacent conveyors, stop members 13 are disposed so as to come in contact with the rod-shape members 11 and tongue pieces 14 vertically projected from the frames 9. The stop members 13 are secured to the frames 9 by bolts 16. In order to prevent coming-up of respective two rod-shape members 11 located between adjacent conveyors, stop members 17 are disposed so as to come in contact with the rod-shape members 11. The stop members 17 are secured to the frames 9 by bolts 18. Such arrangement permits the conveyor means 5 to be adjusted in tension with the rod-shape members 11 shortened and lengthened. Such adjustment may be made with each of the conveyors vertically swung. Thus, adjustment of one rod-shape member 11 may be readily made without any disturbance by the conveyors adjacent to said one rod-shape member 11. Input sprockets 19 are rotatable integrally with the rear-side rotary members 8.

Covers 20 are disposed for closing the gaps between the side plates 9A and their adjacent conveyors, while covers 21 are disposed for covering the gaps between respective adjacent two conveyors. These covers 20 and 21 are bolt-secured, at the front ends thereof, to brackets 22 attached to the frames 9 and at the rear end portions thereof, to the frames 9 by bolts 23 passing through the covers 20 and 21. Such arrangement permits to restrain falling of harvested grain stalks to the gaps above-mentioned.

Distance adjusting cylindrical members 24 are put on the bolts 23 which secure the covers at their rear ends.

The conveyor means 5 is constituted by a plurality of conveyors each having a wide belt having grain stalk engagement projects 5a with suitable intervals in the longitudinal direction. Disposed on the conveyor reverse side at its transverse ends are V-belt-shape portions 5b to be engaged with annular concaves U in the front- and rear-side rotary members 12 and 8, such that transverse slip of the belt is restrained. Linear projections 5c are disposed on each conveyor surface at the transverse ends in the longitudinal direction, so as to prevent grain stalks from entering under the covers 20 and 21.

Scrapers 25 connected to the rod-shape members 11 are engagingly entered into the annular concaves U.

The auger equipped drum 6 has augers 6a at the both lateral sides of the drum 6 for transversely conveying stalks, and a plurality of stalk engagement rods 6b between the augers 6a. The rods 6b are rotatable integrally with the drum 6 with the projection amount of the rods 6b from the drum 6 varied as the drum 6 is rotated.

A stalk guide plate 26 is disposed under the auger equipped drum 6 such that the front end of this plate 26 is separated from the front conveyor means rear end with a certain distance, through which foreign matter such as straw waste is discharged.

It is a matter of course that the present invention may be variously embodied. For example, the general structure and support structure of the front conveyor means 5 may be modified, and the devices mounted on the harvester machine may also be modified.

We claim:
1. A combine harvester machine, comprising
  a machine body having harvester frames and side plates,
  a reel connected to the machine body for raking grain stalks toward the machine body,
  cutting means connected to the harvester frames and located under the reel, said cutting means cutting grain stalks raked by said reel,
  a drum having augers at an outer periphery thereof and rotationally connected to the machine body to transfer grain stalks rearwardly of the machine body,
  front conveyor means connected to the harvester frames between the cutting means and the drum to transfer the grain stalks cut by the cutting means to the drum, said front conveyor means including a plurality of conveyors arranged side by side between the side plates of the machine body, each conveyor including:
  a rear rotary member rotationally connected to the frames and adapted to be rotated by power means,
  rod-shaped members each having front and rear ends and a turnbuckle between the front and rear ends so that the length of the rod-shaped member is adjusted by the turnbuckle, each rod-shaped member being pivotally connected to side of the rear rotary member at the rear end thereof,
  a front rotary member rotationally connected to the front ends of the rod-shaped members, and
  a conveyor belt situated between the front and rear rotary members, an imaginary surface extending through an upper surface of the conveyor belt, when the conveyor is operated for transfer of the grain stalks, passing substantially adjacent to a lower periphery of the drum to smoothly transfer the grain stalks to the drum, each conveyor being independently pivotable relative to the rear rotary member to facilitate maintenance of each conveyor,
  covers situated along upper side portions of the conveyor belts to completely cover spaces between the conveyor belt and adjacent structure, each cover including a first bolt for connecting a front portion of the cover to the frame, a second bolt with a head, said second bolt passing through a rear portion of the cover and connected to the frame, and a cylindrical member situated around the second bolt so that the cover is securely retained between an upper portion of the cylindrical member and the head of the second bolt, and
  stop members and third bolts, said third bolt passing through the stop member and being detachably connected to the frame so that the stop member engages the rod-shaped member to prevent the rod-shaped member from swinging upwardly when the machine is operated, and each conveyor is independently turned upwardly relative to the rear rotary member for maintenance thereof when the stop member is removed from the frame by detaching the third bolt.

2. A combine harvester machine according to claim 1, in which said conveyor belt of the conveyor includes linear projections along the lateral ends thereof to prevent the grain stalks from being transferred under the covers.

3. A combine harvester machine according to claim 2, in which said front and rear rotary members include annular concave grooves, the inside of the conveyor belt including V-belt shaped portions, the V-belt shaped portions engaging the annular concave grooves of the front and rear rotary members to prevent transverse slip of the conveyor.

* * * * *